United States Patent
Lund

(10) Patent No.: US 11,620,488 B1
(45) Date of Patent: Apr. 4, 2023

(54) SYSTEMS, DEVICES, SOFTWARE, AND METHODS FOR SIMULATING INTERACTIONS BETWEEN ORGANISMS CONSISTING OF FIREFLIES, FROGS AND SNAKES IN ELECTRONIC DEVICES

(71) Applicant: Jason Lund, Elkridge, MD (US)

(72) Inventor: Jason Lund, Elkridge, MD (US)

(*) Notice: Subject to any disclaimer, the term of this patent is extended or adjusted under 35 U.S.C. 154(b) by 1185 days.

(21) Appl. No.: 16/131,239

(22) Filed: Sep. 14, 2018

Related U.S. Application Data

(60) Provisional application No. 62/558,840, filed on Sep. 14, 2017.

(51) Int. Cl.

| | |
|---|---|
| *G06N 3/00* | (2006.01) |
| *G06V 10/141* | (2022.01) |
| *G01S 19/14* | (2010.01) |
| *G06N 3/008* | (2023.01) |
| *H05B 45/10* | (2020.01) |
| *H05B 47/11* | (2020.01) |
| *H05B 47/12* | (2020.01) |
| *H05B 47/19* | (2020.01) |

(52) U.S. Cl.
CPC .............. *G06N 3/008* (2013.01); *H05B 45/10* (2020.01); *H05B 47/11* (2020.01); *H05B 47/12* (2020.01); *H05B 47/19* (2020.01)

(58) Field of Classification Search
CPC ............................ G06V 10/141; G01S 19/14
See application file for complete search history.

(56) References Cited

U.S. PATENT DOCUMENTS

| | | | |
|---|---|---|---|
| 8,594,959 B2 | 11/2013 | Schaal et al. | |
| 8,928,227 B2 | 1/2015 | Padula et al. | |
| 9,035,558 B2 | 5/2015 | Padula et al. | |
| 2019/0215654 A1* | 7/2019 | Engelen | G06V 10/141 |

FOREIGN PATENT DOCUMENTS

| | | | | |
|---|---|---|---|---|
| EP | 2590116 A2 * | 5/2013 | ............ | G01S 19/14 |
| JP | 3147211 B2 * | 3/2001 | | |

* cited by examiner

*Primary Examiner* — Farzad Kazeminezhad
(74) *Attorney, Agent, or Firm* — Nemphos Braue LLC; Michael Antone

(57) ABSTRACT

Hardware and/or software systems, devices, networks, and methods of the present invention enable ornamental devices, and interactive electronic devices in general, to generate and react to stimulus from other devices. In various embodiments electronic devices generate one or more pseudo-stimuli and stimuli and/or react to the stimuli generated by other devices mimicking fireflies, other bioluminescent organisms, and other interacting organisms. Pseudo-stimuli generally simulates the physical stimulus of the organism. Whereas the stimulus may include naturally-occurring stimulus, as well as technology generated stimuli to increase system robustness. When a stimulus generated by a first electronic device is detected by one or more second electronic devices, the second devices may react in one or more different methods.

20 Claims, 5 Drawing Sheets

SYSTEMS, DEVICES, SOFTWARE, AND METHODS FOR SIMULATING INTERACTIONS BETWEEN ORGANISMS CONSISTING OF FIREFLIES, FROGS AND SNAKES IN ELECTRONIC DEVICES

CROSS-REFERENCE TO RELATED APPLICATIONS

This non-provisional patent application claims the benefit of and priority to U.S. Provisional Patent Application No. 62/558,840 filed Sep. 14, 2017, which is incorporated herein by reference in its entirety.

BACKGROUND OF THE INVENTION

Field of the Invention

The present invention relates in general to generating responses in electronic devices in reaction to stimulus received from other electronic devices, and, more specifically to hardware and/or software systems, devices, networks, and methods for simulating interactions between organisms.

Background Art

Electronic devices have been developed over the years to simulate the luminescent behavior of fireflies primarily for ornamental purposes. For example, U.S. Pat. Nos. 8,594,959, 8,928,227, and 9,035,558, which are incorporated herein by reference, describe various features that may be employed in ornamental fireflies and other organisms. While ornamental fireflies can be easily enabled in all sorts of shapes, sizes, and colors with modern electronics and light emitting diodes, there remains a limited market for these types of ornamental devices.

As such, there is a continuing need for improved systems, devices, and methods that provide increased levels of functionality in ornamental and other devices that increase the market demand.

BRIEF SUMMARY OF THE INVENTION

Accordingly, hardware and/or software systems, devices, networks, and methods of the present invention enable ornamental devices, and interactive electronic devices in general, to generate and react to stimulus from other interactive electronic devices simulating interactions between organisms.

In various embodiments a first Interactive Electronic Organism Simulation Device ("IEOSD") emits a pseudo-stimulus simulating a stimulus generated by an organism and transmits a stimulus including a first Identifier ("ID") associated with the first electronic device. For example, the first IEOSD may emit light as a pseudo-stimulus simulating a bioluminescent organism, such as a firefly, or emit a sound, and also transmit an IR signal as a stimulus that includes a first ID or code associated with the first IEOSD. The first IEOSD may also modulate the emitted light, sound, etc. with the first ID, so the pseudo-stimulus and stimulus are included in the same signal, as opposed to the pseudo-stimulus and stimulus being transmitted via two or more distinct signals, actions, etc. A second IEOSD receives the stimulus, extracts the first ID from the stimulus, determines a reaction associated with the first ID, and executes the reaction. The reaction may include emitting the same or a different pseudo-stimulus in friendly reaction, such as between fireflies, or an unfriendly reaction, such as between a frog and a snake. The reaction may also include transmitting the same or a second different stimulus that may be received by the first IEOSD or other IEOSDs, as in a chain notification.

In various embodiments, the electronic organism devices may be equipped with one or more wireless signal emitters and/or detectors to simulate the interaction between fireflies and other bioluminescent organisms. For example, when stimulus generated by a first electronic bioluminescent organism device is detected by one or more second electronic bioluminescent organism devices, the second device(s) may react in one or more different ways. For example, the second device(s) may emit light, change the wavelength of light emitted by their emitter, vary the amount of time the light is emitted, emit light in different patterns, etc. In various embodiments, the reaction to the stimulus may be varied depending upon characteristics assigned to a particular bioluminescent organism.

The interaction and behavior of fireflies and other organisms may be implemented on various electronic devices that are configured to generate and/or react to stimulus. The generation and reaction may be implemented in software and/or in hardware that may be implemented as an application running on a general purpose devices, as well as specific purpose interactive electronic devices.

In various embodiments, one or more software applications ("apps") may be installed on a plurality of devices and configured by the individual user and/or a system coordinator to provide different functionality. For example, the app may be configured to generate one or more stimuli and provide various reactions when two devices interact. A particular instance of this interaction could be electronic fireflies or other electronic devices, which may include a wireless transmitter that emits a signal, such as a code, at a certain wavelength as the stimulus. Other devices with receivers may be configured to react to the stimulus, by lighting up, buzzing, changing color, logging the stimulus, etc. The electronic devices may be configured to limit interaction by limiting the strength of the signals emitted and signals received and acted upon, such that the devices must be within a general range before the reaction occurs.

The use of a pseudo-stimulus in addition to a stimulus may provide for increased reliability and functionality in systems simulating organism interaction. In a redundancy configuration, the pseudo-stimulus and stimulus may be transmitted in parallel or serially by a first IEOSD to a second IEOSD.

As may be disclosed, taught, and/or suggested herein to the skilled artisan, the present invention addresses the continuing need for hardware and/or software systems, devices, networks, and methods that enable improved ornamental and other applications.

BRIEF DESCRIPTION OF THE DRAWINGS

The accompanying drawings are included for the purpose of exemplary illustration of various aspects of the present invention to aid in description, and not for purposes of limiting the invention, wherein.

Figure 1:
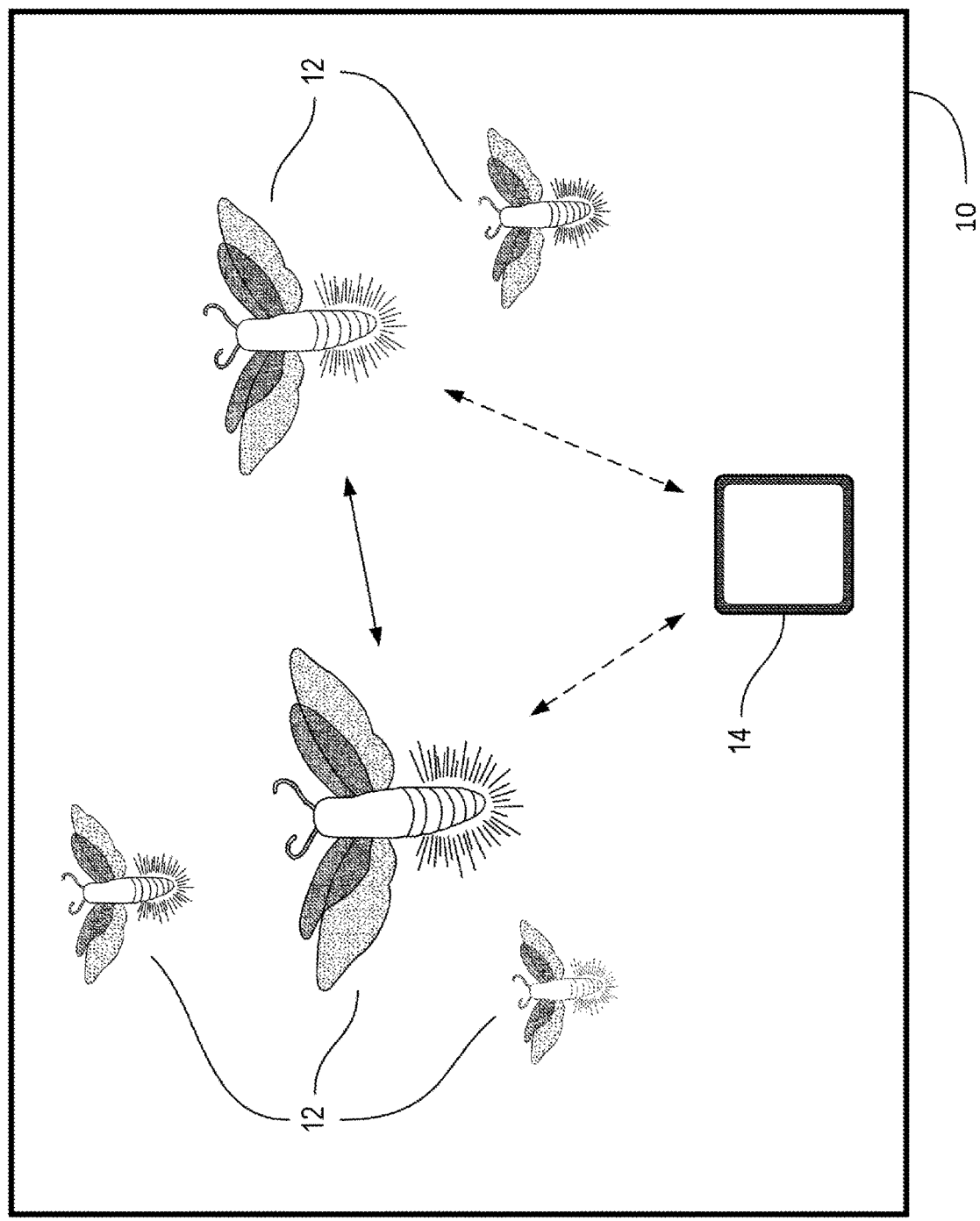
FIG. 1 illustrates exemplary embodiments of the system with a plurality of specific purpose interactive electronic devices.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Hardware and/or software systems, devices, networks, and methods of the present invention are described herein, by way of example and otherwise.

FIG. 1 illustrates exemplary embodiments of the system 10 in which IEOSD 12 communicate or interact with other IEOSDs 12. In various embodiments, IEOSD 12 generate one or more stimuli and/or react to the stimuli generated by other electronic organism devices. The pseudo-stimuli, stimuli and reaction may include naturally occurring stimuli, such as audio, visual, vibrational, touch, other sensory, electromagnetic, mechanical, etc., as well as stimuli enabled by technology, such as wireless communications and signaling, e.g., optical, radio, etc.

The system 10 may include a Management Platform ("MP") 14, which may be centrally located or distributed. The MP 14 may be used to oversee the operation of the IEOSDs 12, allow for reprogramming of the IEOSD 12, provide a gaming or social interaction platform, etc.

In FIG. 1, the IEOSDs 12 are depicted as firefly-shaped devices; however, the IEOSDs 12 may be any type of general or specific purpose interactive electronic device 12, such as another organism shape or a mobile phone. Likewise, the management platform 14 is depicted as a tablet, but may be any type of fixed, portable, or mobile electronic device capable of interacting with the IEOSDs 12.

It will be appreciated that some IEOSD 12 may be "hardwired" or not reprogrammable. Those IEOSDs 12 may be incapable of interacting with the management platform 14, except during the manufacturing, repair, & rebuild stages.

In addition, a two way arrow is shown between the IEOSDs 12 and between the IEOSDs 12 and the MP 14, when present (as denoted by a dashed line). It will be appreciated that various embodiments may include only one way communication between some or all of the IEOSDs 12 and/or MP 14. For example, the MP 14 may be used to push settings to the IEOSDs 12 and/or collect data and settings from the IEOSDs 12. Similarly, certain IEOSDs 12 may involve two way communication with other IEOSDs 12 or one-way (either transmit or receive) communication depending upon the embodiment.

In various embodiments of the system 10, most IEOSDs 12 will communicate wirelessly, because the IEOSDs 12 may often be in motion with a user or a mobile device. The MP 14, when present, may communicate with the IEOSDs 12 via a wireline or wirelessly depending upon the configuration of the system 10. In various embodiments, the IEOSD 12 may interact with other devices 16, such as Internet of Things ("IoT") devices or wireless enabled devices in general for networking or other purposes.

In various embodiments, a first IEOSD emits a pseudo-stimulus simulating a stimulus generated by an organism, e.g., lights, sounds, vibrations, etc., and transmits a stimulus (a communication signal) including a first ID associated with the first electronic device. For example, the first IEOSD 12 may emit light as a pseudo-stimulus simulating a bioluminescent organism, such as a firefly, or sound and also transmit an IR or RF signal as a stimulus that includes a first ID or code associated with the first IEOSD 12. The first IEOSD 12 may also modulate the emitted light, sound, etc. with the first ID, so the pseudo-stimulus and stimulus are carried on, or part of, one signal, emission, transmission, as opposed to the pseudo-stimulus and stimulus being transmitted via two or more distinct signals, emission, transmissions, actions, etc.

One or more second IEOSDs 12 may receive the stimulus, extract the first ID from the stimulus, determine a reaction associated with the first ID, and execute the reaction. For example, the second IEOSD 12 may emit the same or a different pseudo-stimulus in friendly reaction, such as between fireflies, or an unfriendly reaction, such as between a frog and a snake. The reaction may also include transmitting the same or a second different stimulus that may be received by the first IEOSD 12 or other IEOSDs 12, as in a chain notification.

The use of a pseudo-stimulus in addition to a stimulus may provide for increased reliability and functionality in systems simulating organism interaction. In a redundancy configuration, the pseudo-stimulus and stimulus may be transmitted in parallel or serially by the first IEOSD 12 to the second IEOSD 12. For example, the first IEOSD may emit the pseudo-stimulus and stimulus including the first ID and await feedback from the second IEOSD 12, which may be part of the reaction. If the feedback is not received, then the first IEOSD 12 may re-transmit the stimulus with or without the pseudo-stimulus. Since the pseudo-stimulus mimics the stimulus from the organism, the stimulus need not mimic the organism interaction. Therefore, a more robust communication technology may be employed for the stimulus to add robustness to the system 10.

Figure 2:
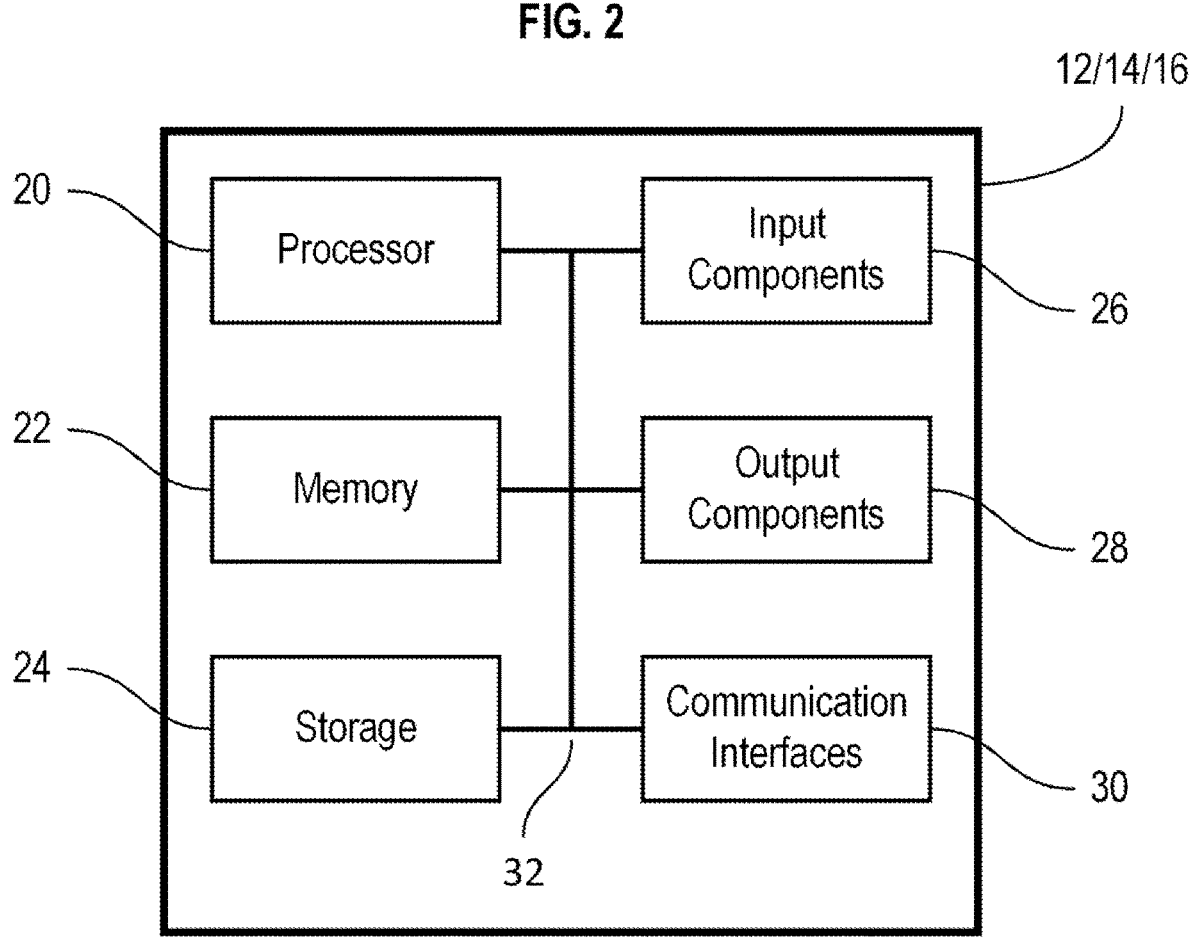
FIG. 2 illustrates exemplary components in various computing resources of the system.

FIG. 2 illustrates exemplary component embodiments that may be employed in the IEOSDs 12, management platform 14, and devices 16 that may interact with the system 10, which may be generally referred to as "computing resources". The computing resources may each include one or more processors 20, memory 22, storage 24, input components 26, output components 28, communication interfaces 30, as well as other components that may be interconnected as desired by the skilled artisan via one or more buses 32. As previously described, while the components for the IEOSDs 12 and IoT devices 16 may often be configured as a single device or multiple devices in close proximity, the management platform 14 may be a single device or have multiple components in one or more coupled units, distributed in close proximity, and/or over geographically remote areas.

Processor(s) 20 may include one or more Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc.) that interpret and/or execute logical functions. The processors 20 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 20 may connect to other computer systems and/or to telecommunications networks as part of performing one or more steps of one or more processes described or illustrated herein, according to particular needs. Moreover, one or more steps of one or more processes described or illustrated herein may execute solely at the processor 20. In addition, or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 22 may include Random Access Memory ("RAM"), Read Only Memory ("ROM"), and/or another type of dynamic or static storage device, such as flash, magnetic, and optical memory, etc. that stores information and/or instructions for use by processor 20. The memory 22 may include one or more memory cards that may be loaded on a temporary or permanent basis. Memory 22 and storage 24 may include a Subscriber Identification Module ("SIM") card and reader.

Storage components 24 may store information, instructions, and/or software related to the operation of the system 10 and computing resources. Storage 24 may be used to store operating system, executables, data, applications, and the like, and may include fast access primary storage, as well as slower access secondary storage, which may be virtual or fixed.

Storage component(s) 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 26 and output components 28 may include various types of Input/Output ("I/O") devices. The I/O devices often may include a Graphical User Interface ("GUI") that provides an easy to use visual interface between the user and system 10 and access to the operating system or application(s) running on the devices.

Input components 26 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature, location via Global Positioning System ("GPS") or otherwise, accelerometer, gyroscope, actuator data, which may be input via a component in the user device 12 and/or received via one or more communication interfaces 30.

Output component 28 may include displays, speakers, lights, sensor information. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, Super-WiFi, 802.15.4, WiMax, LTE systems, LTE Direct, past, current, and future cellular standard protocols, e.g., 4-5G, or other wireless signal protocols or technologies as described herein and known in the art.

In addition, while the invention has been described relative to any wireless signal type and technology, it will be appreciated that it may be desirable to constrain the system 10 to a smaller set of wireless technologies, which may reduce the amount of IEOSDs 12 detected at any point in time. For example, it may be desirable to focus the system 10 on wireless protocols that are shorter range, Local Area Network ("LAN"), Personal Area Network ("PAN"), etc., and with more commonly used protocols, such as the various IR, WiFi, NFC, and Bluetooth protocols. However, such decisions may vary depending upon how the skilled artisan is implementing the system 10.

Bus(es) 32 may connect a wide variety of other subsystems, in addition to those depicted, and may include various other components that permit communication among the components in the computing resources. The bus(es) 32 may encompass one or more digital signal lines serving a common function, where appropriate, and various structures including memory, peripheral, or local buses using a variety of bus architectures. As an example and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-eXtended ("PCI-X") bus, a Peripheral Component Interconnect Express (PCIe) bus, a Controller Area Network ("CAN") bus, and an Accelerated Graphics Port ("AGP") bus.

The computing resources of the system 10 may provide functionality as a result of the processors 20 executing software embodied in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps may include defining data structures stored in memory 22 and modifying the data structures as directed by the software.

Figure 3:
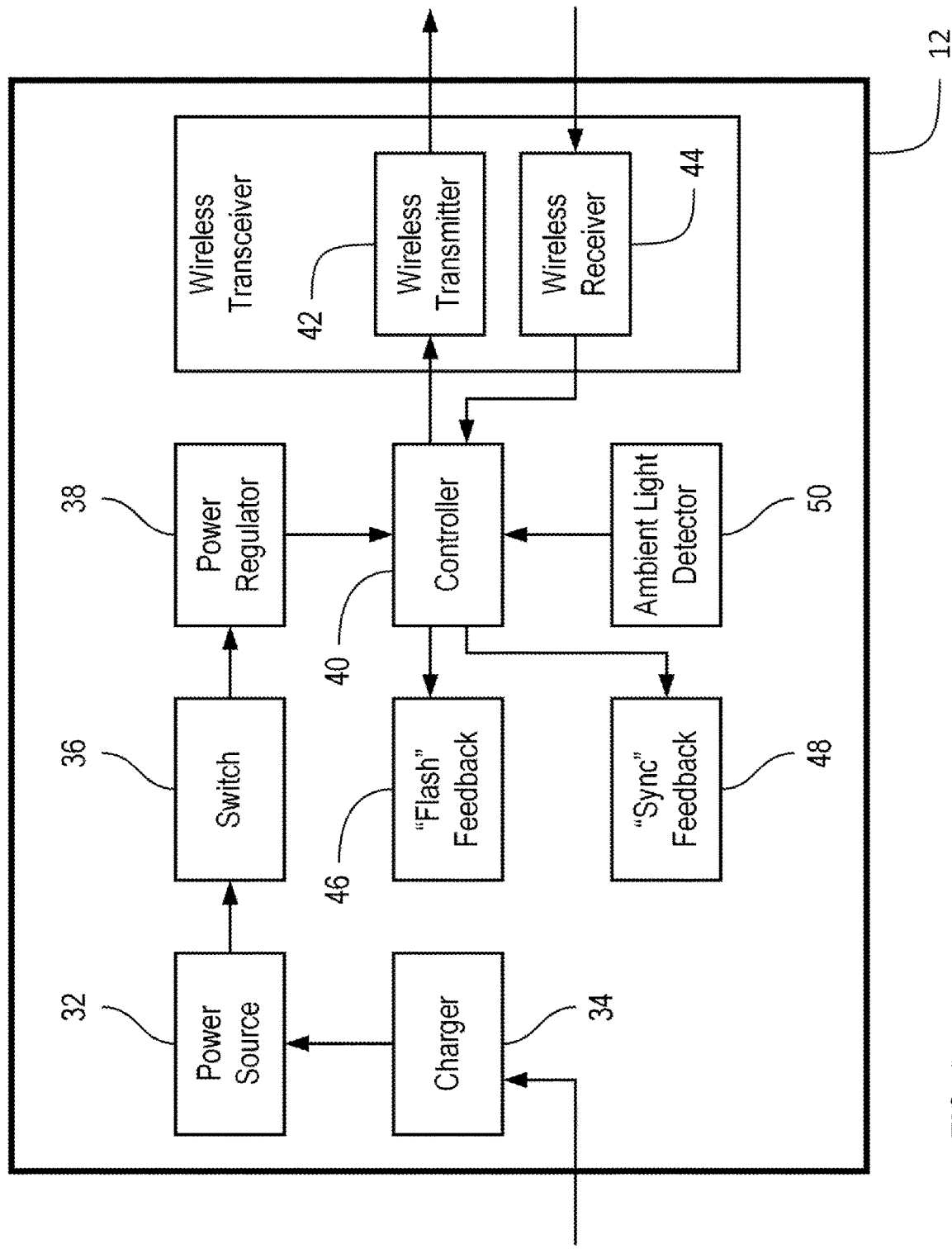
FIG. 3 illustrates exemplary embodiments of various interactive electronic devices.

FIG. 3 illustrates exemplary embodiments of various interactive electronic devices 12. The IEOSD 12 may include a power source 32, which may include one or more batteries. For example, a firefly embodiment may be powered by a single non-rechargeable CR3032 3V battery.

If the power source 32 is one or more rechargeable batteries, an integrated charging circuit 34 may be advantageous. The input to the charger 34 can be either externally sourced energy or internally collected (solar cell, kinetic, etc.)

An optional switch 36 may be provided to enable/disable current flow from the power source 32. It may be desirable to include one or more regulators 38 to normalize the battery and/or external source voltage to nominal values for other components in the device 12. For example, a controller 40 may have a low input voltage for power savings but the transmitter 42 or receiver 44 may require higher voltages.

In various device embodiments, the voltage regulator 38 may regulate the battery down to 2.5V using an integrated circuit and several passive components. However, it may be desirable to have multiple voltage rail values in order to satisfy individual component needs and power savings.

As noted above, the controller/processor 40 may include one or more sequential processors (microprocessor, etc.), parallel processors (programmable logic device, etc.), custom silicon, etc. The functionality being implemented may be distributed among the various components. The controller 40 may implement synchronization orchestration (data transmit/receive and user perceptible feedback) and include various power modes to preserve power, such as a "low power" mode for minimized idle processing. A synchronization filter may also be included in order to tolerate missed and corrupted transmission receipt.

The controller 40 may also manage a state machine implementing interactions, as will be described below, so data transmit/receive functions may be linked to natural behavior. For example, firefly embodiments of the device 12 may implement behaviors, such as those described in Flight Studies on Photic Communication by the Firefly Photinus pyralis, James F. Case, INTEGR. COMP. BIOL., 44:250-258 (2004), which is incorporated herein by reference.

The wireless transmitter 42 and receiver 44 may be provided as separate components or as a combined transceiver component. As noted above, the wireless communication method for data transfer and sync may be infrared, RF, etc. Logically the transceiver is managed by the controller, but the required current does not need to be sourced from the controller.

In various firefly embodiments of the device 12, the transmitter 42 may employ an infrared Light Emitting Diode ("LED"), where data, i.e., "bits", are modulated against a 38 KHz periodic pulse. The controller 40 may generate the modulated data using a Pulse Width Modulation ("PWM") pin. The receiver 44 may use a frequency-matched infrared receiver, where demodulation may be performed in a Commercial Off the Shelf ("COTS") part and raw data bits are sent to the controller 40 for interpretation.

In various embodiments, a visual "flash" feedback 46 may be used to indicate the device 12 is in a "transmit" phase.

Logically, the feedback 46 may be managed by the controller 40, but it does not need to be powered by the controller 40.

On various firefly embodiments, the visual feedback 46 may be three green LEDs to emulate a uniform or tapered bio-luminescence pattern. The feedback 46 emulates a Gaussian irradiance pattern or similar generated by the controller 40 using a PWM pin. One of ordinary skill will appreciate that various feedbacks 46 may be employed to achieve an effect desired by the user.

It may also be desirable to include a "sync" feedback 48 to the user indicating a sync has occurred. Similar to the flash feedback 46, the sync feedback 48 may be managed by the controller 40 and powered from the controller 40 or another component. In various organism embodiments, the synchronization feedback may be a red LED whose flash emulates a repeating heartbeat pattern as long as the sync is present.

An ambient light detector 50 may be provided to detect ambient light luminescence, which may be used by the controller 40 in various ways, such as to vary the power mode of the device 12. For example, the luminescence level may be used to disable synchronization processing in bright areas for bioluminescent organism devices 12 in order to preserve power.

Figure 4:
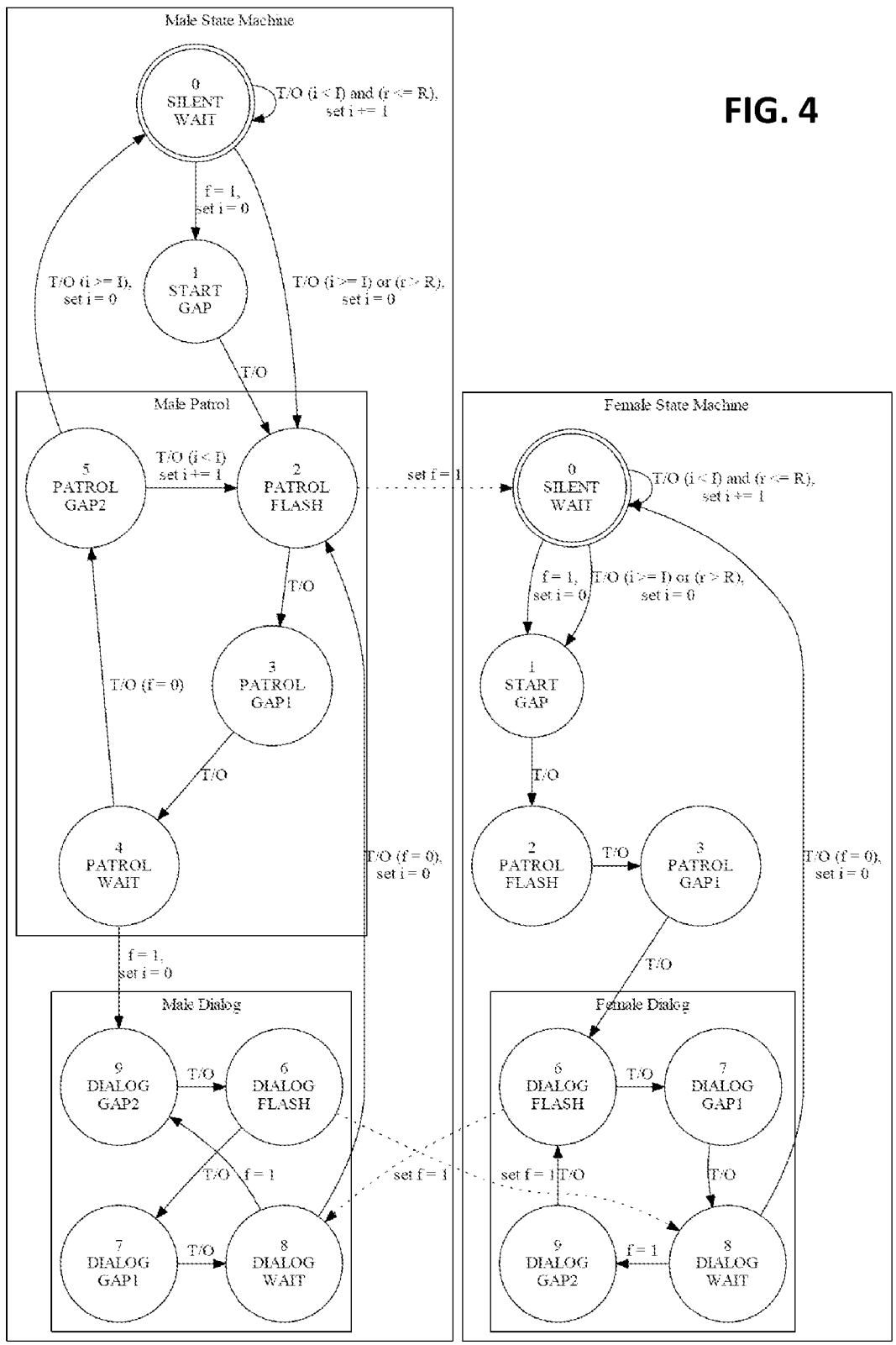
FIG. 4 illustrates exemplary embodiments of a state machine to be implemented on one or more devices in the system.

FIG. 4 illustrates exemplary embodiments of a state machine that may be implemented on one or more devices 12 in the system 10. The state machine diagram shows exemplary nominal interactions as dotted lines between a paired male and female device, as not all possible interactions are indicated and one of skill in the art may construct variations of the machine.

In FIG. 4, "T/O" indicates a transition is based on the timeout value for a given state. The timeout value may be a constant number or a variable. For example, a constant number may be used for each state type, which may be fuzzed using a random, pseudo-random, or other type of offset to emulate "imperfect" timing characteristics. Furthering the example, if a nominal timeout value were set at 500 ms, the value may be fuzzed to +/−50 ms in a uniform distribution about the nominal (mean) value.

The variable "i" indicates a current iteration counter, while "I" indicates an iteration "max count" for this state. Variable "r" may be current pseudo-random number and "R" may be defined as a threshold pseudo-random number for this state. The iteration counter and pseudo-random number may both be fuzzed as described above. "f" indicates a transmitted or received "flash" value (on, 1/off, 0).

Timing values, tCFM & tCFF, may be set for a flash timeout for male/female devices, respectively, which is the amount of time a bioluminescent organism device 12 visually performs the bio-luminescent flash. The pattern of flash luminescence may be configured to give a perception of a Gaussian pulse to a human eye, or another pattern may be employed. The pattern could also be different for a male or female device, and the radiance values could be "fuzzed" as well. For example, tCFM & tCFF values may be set nominally to 500 ms for both male and females, or to different values.

Various response times may be set to control the pace of the interaction between devices 12. The response times may be user controlled based on the organism or type of interaction being simulated or arbitrarily by a user merely desiring to establish a unique interaction experience for gaming or other social interaction.

Returning to our bioluminescent organism example, Receipt response times, tRM & tRF, may be set to an amount of time between the receipt of a flash in a SILENT WAIT state to the midpoint of the first response flash transmission state timeout for a male and female. For example, tRM & tRF may be set nominally to 500 ms for both male and females in firefly embodiments.

A dialog response time, tDRF, may be set for the respondent, e.g., female firefly, to specify a total amount of time between the receipt of a flash in a SILENT WAIT state to the midpoint of the second response flash transmission state timeout. For example, tDRF may be nominally set to 2000 ms.

A patrol time, tP, may be used to set a total amount of time between flashes for a single device 12 in a "Patrol" behavior set when no receipts of flashes takes place. For example, tP may be nominally set to 5500 ms.

A dialog time, tD, may be used to set a total amount of time between flashes for a single device 12 in a "Dialog" behavior set when both devices 12 are interacting, e.g., flashing in response to each other. For example, tD may be nominally set to 6000 ms.

In FIG. 4 implementations, the system 10 may include high-level behavior sets, such as Silent, Patrol, Dialog, etc. One of ordinary skill will appreciate that while FIG. 4 is directed to a male-female firefly state machine pair, the concepts are generally applicable in various embodiments of the present invention to other organisms including humans.

Silent behavior is relevant for both a male and female firefly device 12, mimicking a firefly silently waiting for a bio-luminescent flash and either setting up for response once received, and/or to stimulate other fireflies to respond.

Patrol behavior in a male firefly device may mimic a firefly flashing without stimulus in order to stimulate other fireflies to respond. Whereas, patrol behavior may mimic the first flash of a female firefly in response to a stimulus before the second dialog flash is emitted.

Dialog behavior mimics the interaction between two devices, which, in the case of fireflies, involves emitting and receiving simulated bio-luminescent flashes in a time coordinated way.

Referring to FIG. 4, SILENT WAIT state 0 is part of the "Silent" behavior set. The SILENT WAIT (0) may include a nominal timeout value, e.g, 1000 ms. The timeout value is how long a user wants a device 12 to remain silently idle when in the associated behavior set.

This state may be transitioned by either:
the receipt of a flash, transitioning to the START GAP state, or
a state timeout.

The state timeout may occur where:
the current iteration count has not reached the maximum iteration count for this state and the current pseudo-random value is below or equal to the threshold; this transitions back to the same state (SILENT WAIT), or
the current iteration count has reached the maximum iteration count for this state or the current pseudo-random value is above the threshold. For male firefly devices, the state transitions to a PATROL FLASH state (2), although any of the "Patrol" or "Dialog" behavior set states may be used or even a START GAP (1) state. For female devices, the state transitions to the START GAP (1) state, although any of the "Patrol" or "Dialog" behavior set states may be used as well.

When a state is left, the current iteration counter for that state is typically reset to zero.

START GAP (1) is part of the "Silent" behavior set. For both male and female devices, a nominal timeout value, e.g., 250 ms, may be used or calculated, such as by using the formula:

$$tSGM = tRM - (tCFM/2)$$

$$tSGF = tRF - (tCFF/2)$$

The START GAP (1) state may be left by a timeout event, transitioning to the PATROL FLASH (2) state.

The PATROL FLASH (2) state is part of the "Patrol" behavior set. In this state the firefly device is generating a stimulus, i.e., a flash of a specific duration and intensity pursuant to the set pattern. In various embodiments, the IEOSD 12, the actual stimulus transmitted by the IEOSD 12 may be performed in combination or separate from other actions including reactions of the IEOSD 12. For example, in various organism, the reaction and stimulus may involve the same function, such as flashing to stimulate a response and flashing in response or reaction to the stimuli.

In the IEOSD 12, visible light flashing may be used as a stimulus and reaction, a stimulus, or a reaction. For example, the IEOSD 12 simulating a bioluminescent organism may flash a visible light as the stimulus to be received by a visible light receiver/detector. Alternatively, the visible light flash may only be simulating the transmission of the stimulus with the actual stimulus being sent by one or more other communication paths, such as with IR or RF signaling. Similarly, in response, or reaction, to receiving stimulus the IEOSD 12 may be configured to flash a visible light as well as sending a response via one or more other communication paths.

For both male and female firefly devices, a nominal timeout value, e.g., 500 ms, may be used or calculated, for example, using the formula:

$$tPFM = tCFM$$

$$tPFF = tCFF$$

The PATROL FLASH (2) state may be left by a timeout event, transitioning to the PATROL GAP1 state.

The PATROL GAP1 (3) is part of the "Patrol" behavior set. For a male firefly device, a nominal timeout value, e.g., 1500 ms, may be used or calculated, for example, using the formula:

$$tPG1M = tDRF - (tPFM/2) - (tPWM/2)$$

For a female firefly device, a nominal timeout value, e.g., 1000 ms, may be used or calculated, for example, using the formula:

$$tPG1F = tDRF - tPFF - tSGF - (tDFF/2)$$

The PATROL GAP1 (3) state may be left by a timeout event, transitioning to the PATROL WAIT (4) state.

The PATROL WAIT (4) is part of the "Patrol" behavior set. For a male firefly device, a nominal timeout value, e.g., 500 ms, may be used or calculated, for example, using the formula:

$$tPWM = tCFF$$

For a female firefly device, this is an unused state in this exemplary state machine.

In PATROL WAIT (4) state, the male device 12 is actively looking for a flash indication from the female device 12. As described above, the flash indication may involve a pseudo-stimulus light emission and a stimulus transmission via another communication path, such as an IR signal encoded with the first ID or a generic code. Alternative, the flash of light may be the stimulus as well as the pseudo-stimulus. It may be desirable to set a time out that is relative to a flash time of the sending device, so as to ignore emissions that are not within the timing window for a paired device.

The male device leaves the PATROL WAIT (4) state by either:
- a timeout event, transitioning to the PATROL GAP2 (5) state, or
- a flash receipt, transitioning to the DIALOG GAP2 (9) state.

The PATROL GAP2 (5) state is part of the "Patrol" behavior set. For a male firefly device, a nominal timeout value, e.g., 3000 ms, may be used or calculated, for example, using the formula:

$$tPG2M=tP-tPWM-tPG1M-tPFM$$

For a female firefly device, this is an unused state in this state exemplary machine.

The PATROL GAP2 (5) state may be left by the male device either by:
- a timeout event, where the current iteration count has reached the maximum iteration count for this state; the current iteration count is set to zero when transitioning to the SILENT WAIT (0) state, or
- a timeout event, where the current iteration count has not reached the maximum iteration count for this state; the current iteration count is incremented when transitioning to the PATROL FLASH (2) state The DIALOG FLASH (6) is part of the "Dialog" behavior set. In this state the firefly device 12 is generating a stimulus, i.e., a flash of a specific duration and intensity pursuant to the set pattern.

For a male and female device, a nominal timeout value of 500 ms may be used, or it may be calculated for a male and female device respectively as:

$$tDFM=tCFM$$

$$tDFF=tCFF$$

The DIALOG FLASH (6) state may be left by a timeout event, transitioning to the DIALOG GAP1 (7) state.

The DIALOG GAP1 (7) is part of the "Dialog" behavior set. For a male firefly device, a nominal timeout value of 1500 ms may be used, or it may be calculated as:

$$tDG1M=tDRF-(tDFM/2)-(tDWM/2)$$

For a female firefly device, a nominal timeout value of 3500 ms may be used, or it may be calculated as:

$$tDG1F=tDG2F-tDFF-(tDWF/2)$$

The DIALOG GAP1 (7) state may be left by a timeout event, transitioning to the DIALOG WAIT (8) state.

The DIALOG WAIT (8) is part of the "Dialog" behavior set. For a male and female device, a nominal timeout value of 500 ms may be used, or it may be calculated for a male and female device respectively as:

$$tDWM=tCFM$$

$$tDWF=tCFF$$

In the DIALOG WAIT (8) state, the device 12 is actively looking for a stimulus, i.e., flash indication. The wait time may be set equal to a flash time of the sending device as to ignore emissions that are not within the timing window for a paired device.

In the DIALOG WAIT (8) state may be left by either:
- the receipt of a flash, transitioning to the DIALOG GAP2 (9) state, or
- a timeout event, transitioning to the SILENT WAIT (0) state. The timeout event may also be used to transition to other states for different effects, such as START GAP (1), any of the "Patrol" behavior sets, etc.

The DIALOG GAP2 (9) is part of the "Dialog" behavior set. For a male firefly device, a nominal timeout value of 3750 ms may be used, or it may be calculated as:

$$tDG2M=tD-(tDWM/2)-tDG1M-tDFM$$

For a female firefly device, a nominal timeout value of 1750 ms may be used, or it may be calculated as:

$$tDG2M=tDRF-(tDFF/2)$$

The DIALOG GAP2 (9) state may be left by a timeout event, transitioning to the DIALOG FLASH (6) state.

Once a pair of devices 12 enter into the Dialog behavior set, the devices 12 may stay in that behavior set so long as the devices 12 are receiving stimulus, i.e., flashes, from other devices 12, or until a maximum number of interactions or a time limit is reached.

As described above, while FIG. 4 has been described generally in terms of bioluminescent organisms generally and specifically firefly devices, it will be appreciated that firefly or other state machines may be implemented on general purpose, stationary or portable (mobile) electronic devices, such as mobile phones, tablets, PDAs, gaming devices (iPods), wearables, etc. as well as specific purposes devices, such as firefly and other organism and various shapes.

Figure 5:
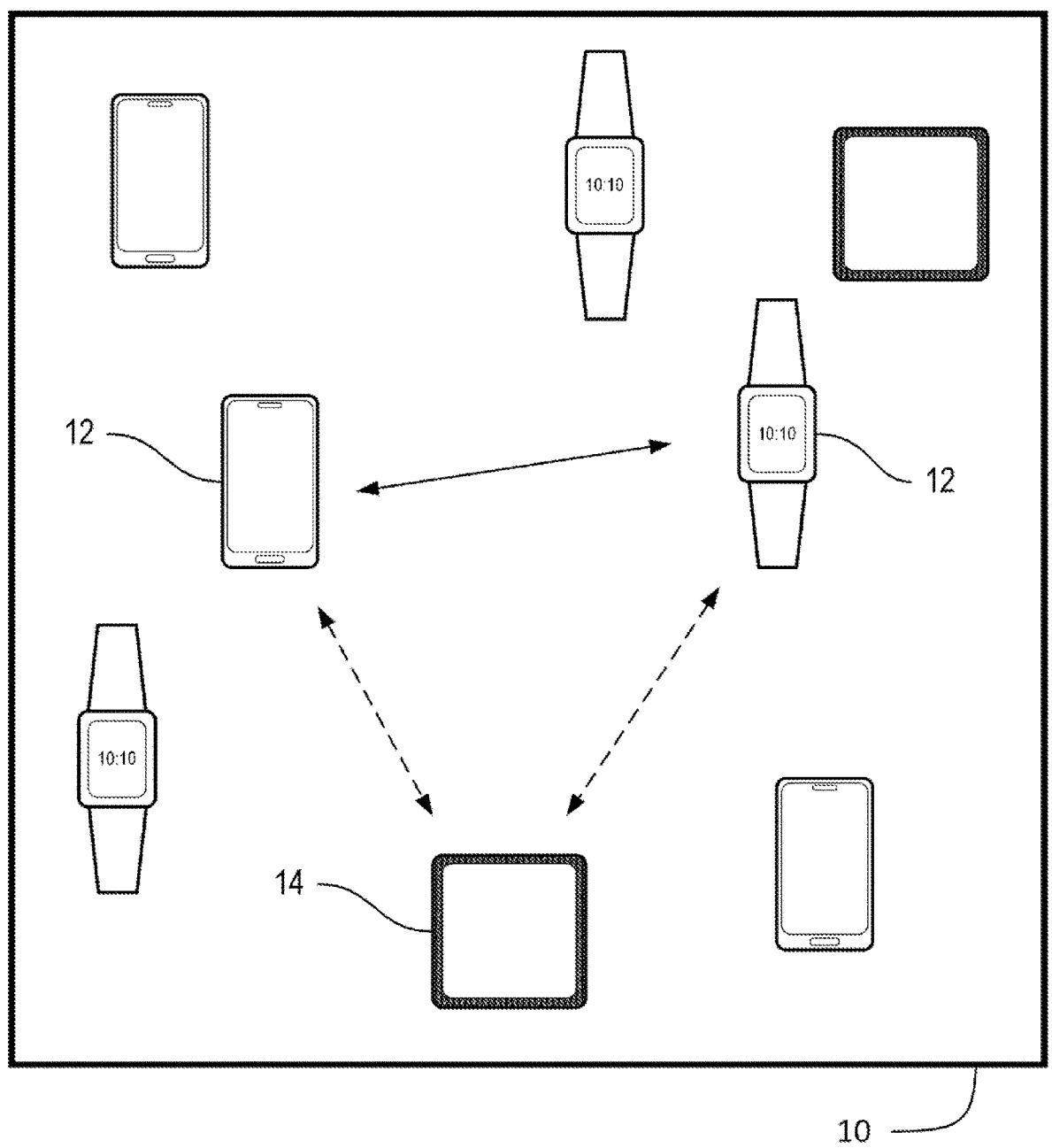
FIG. 5 illustrates exemplary embodiments of the system with a plurality of general purpose interactive electronic devices.

FIG. 5 illustrates exemplary embodiments of the system with general purpose interactive electronic devices 12, similar to FIG. 1 which showed specific purpose firefly shaped devices. It will be appreciated that systems 10 may include both general and specific purpose devices 12 in most any shaped desired to the skilled artisan. Like FIG. 1 embodiments, the MP 14 may or may not be included in the system 10.

Firefly, other organism, or arbitrary state machines may be implemented on general or specific purpose interactive electronic devices 12. For example, the firefly state machine may be implemented on a mobile phone IEOSD 12 in the form of software application running on the device 12 processor. Instead of IR emitters and receivers as described above, the firefly app ("Firefly") may employ the existing wireless transceivers in the mobile phone. Firefly users may decide which wireless technology to employ depending upon the proximity of the various devices that are interacting. For example, Near Field Communications ("NFC") would generally require that the devices 12 be in very close proximity, whereas WiFi would cover a much larger area. Upon detection of a Firefly match, the mobile phone may be configured to provide the user with notice by any means available to the device, sounds, lights, vibrate, etc. and combinations thereof.

In various embodiments, the MP 14 may be used to assign matching codes to different devices 12. In this manner, while some or all of the devices 12 in a given area may be running the Firefly app, a particular IEOSD 12 will only react to a stimulus in the form of the assigned matching code. For example, a first IEOSD 12 may transmit via Bluetooth a first stimulus including a first ID associated with the first IEOSD 12. A second IEOSD 12 may receive the first stimulus and extract the identity from the first stimulus. If the first stimulus has an ID that has not been paired with a corresponding reaction/response assigned to the second IEOSD 12, then second IEOSD 12 does not react or respond. If the first stimulus includes an ID that has been assigned to the second IEOSD 12, then second IEOSD 12 may react by notifying the second IEOSD user and/or responding to the first IEOSD 12 user via another message.

In various embodiments, the system 10 may not employ a MP 14, but a first Firefly user of the IEOSD 12 may set and send out various Firefly IDs or codes to other Firefly users or choose not to do so. Other Firefly users may choose whether to use the Firefly codes or not.

One of ordinary skill in the art will appreciate the myriad of gaming, social, and ornamental variations that may be implemented via Firefly and this disclosure is intended to cover all of them as may be described and enabled hereby.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware and software, and/or a combination of hardware and software, including firmware, etc. It will also be apparent that systems and/or methods, described herein, may be implemented in different forms of hardware and software, or combinations thereof. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Hardware processor modules may range, for example, from general-purpose processors to FPGAsASICs, and combinations thereof. Software modules (executed on hardware) may be expressed in a variety of software languages (e.g., computer code), including hardware specific assembly, C, C++, Java, Javascript, Rust, Go, Scala, Ruby, Visual Basic, FORTRAN, Haskell, Erlang, and/or other object-oriented, procedural, or other programming languages and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   emitting, by a first electronic device, a pseudo-stimulus simulating a physical stimulus emitted by an organism;
   transmitting, by the first electronic device, a stimulus including a first ID associated with the first electronic device;
   receiving, by a second electronic device, the stimulus,
   extracting, by the second electronic device, the first ID from the stimulus,
   determining, by the second electronic device, a reaction associated with the first ID and a second organism,
   executing, by the second electronic device, the reaction, where the first and the second devices are interactive electronic organism simulation devices having the shape of the organisms, wherein the organisms are selected from a group consisting of frogs, snakes, and fireflies.

2. The method of claim 1, further comprising:
   configuring, by a management platform, at least one of the first and second electronic devices with at least one of an ID, a pseudo-stimulus, a stimulus, and a reaction.

3. The method of claim 2, where the configuring is performed after an initial setup.

4. The method of claim 1, where the stimulus is transmitted via emitted light.

5. The method of claim 1, where the stimulus is transmitted via a radio frequency signal.

6. The method of claim 1, where the organisms are one of two fireflies and a frog and a snake.

7. The method of claim 1, where the reaction is emitting light.

8. A system comprising:
a first electronic device having a first ID including at least a first processor to
emit a pseudo-stimulus simulating a physical stimulus emitted by an organism, and
transmit a stimulus including the first ID; and
a second electronic device including at least a second processor to
receive the stimulus,
extract the first ID from the stimulus,
determine a reaction in response to the first ID of a second organism, execute the reaction, where the first and the second devices are interactive electronic organism simulation devices having the shape of the organisms, wherein the organisms are selected from a group consisting of frogs, snakes, and fireflies.

9. The system of claim 8, where the first and second electronic devices are configured receive settings from a management platform to set at least one of:
the pseudo-stimulus,
the stimulus, and
the reaction.

10. The system of claim 9, where the management platform runs on an electronic device configured to communicate with the first and second electronic device via a radio frequency signal.

11. The system of claim 9, where the management platform runs on one of a mobile phone and tablet computer configured to communicate with the first and second electronic device via a radio frequency signal.

12. The system of claim 8, where the reaction includes emitting a different pseudo-stimulus.

13. The system of claim 8, where the reaction includes the pseudo-stimulus and transmitting a second stimulus that includes a second ID.

14. The system of claim 8, where the first and second devices are interactive electronic organism simulation devices and the pseudo-stimulus and reaction simulate the physical stimulus and reaction of bioluminescent organisms.

15. A device comprising:
a processor to
transmit a stimulus,
the stimulus including a first ID,
emit a pseudo-stimulus simulating a physical stimulus generated by an organism;
receive other stimulus not transmitted by the processor, the other stimulus including other IDs from other electronic devices simulating other organisms,
extract the other IDs from the other stimulus,
determine a reaction to the other stimulus based on the other IDs;
execute the reaction, and
receive settings from a management platform to set
the pseudo-stimulus,
the stimulus, and
the reaction, where the processor is included in an interactive electronic organism simulation device having the shape of the organism, wherein the organism is selected from a group consisting of frogs, snakes, and fireflies.

16. The device of claim 15, where the device is an interactive electronic organism simulation device and the stimulus is a radio frequency signal and the reaction is the emission of light simulating a reaction of a bioluminescent organism.

17. The device of claim 15, where the stimulus and pseudo-stimulus are carried by one signal.

18. The device of claim 15, where the pseudo-stimulus simulates a light pattern emitted by at least one of a male and female firefly.

19. The device of claim 15, where at least one of the pseudo-stimulus and the reaction includes emitting an audible sound.

20. The device of claim 15, where the reaction include at least one of changing a color and light pattern emitted by the device.

* * * * *